United States Patent
Kratzer (10) Patent No.: US 11,793,354 B2
(45) Date of Patent: Oct. 24, 2023

(54) HOT FOOD HOLDING STATION WITH MULTI-FUNCTIONAL RAMP

(71) Applicant: H&K International, Mesquite, TX (US)

(72) Inventor: Jay Mitchell Kratzer, Mesquite, TX (US)

(73) Assignee: H&K INTERNATIONAL, Mesquite, TX (US)

( * ) Notice: Subject to any disclaimer, the term of this patent is extended or adjusted under 35 U.S.C. 154(b) by 403 days.

(21) Appl. No.: 17/126,885

(22) Filed: Dec. 18, 2020

(65) Prior Publication Data
US 2021/0186259 A1 Jun. 24, 2021

Related U.S. Application Data

(60) Provisional application No. 62/949,684, filed on Dec. 18, 2019.

(51) Int. Cl.
| | |
|---|---|
| A47J 36/24 | (2006.01) |
| A47J 36/32 | (2006.01) |
| F24H 3/02 | (2022.01) |
| F24C 15/14 | (2006.01) |
| A47J 37/12 | (2006.01) |

(52) U.S. Cl.
CPC ............ *A47J 36/2494* (2013.01); *A47J 36/32* (2013.01); *A47J 37/1271* (2013.01); *F24C 15/14* (2013.01); *F24H 3/02* (2013.01)

(58) Field of Classification Search
CPC .... A47J 36/2494; A47J 36/32; A47J 37/1271; F24C 15/14; F24H 3/02
See application file for complete search history.

(56) References Cited

U.S. PATENT DOCUMENTS

| | | | | |
|---|---|---|---|---|
| 8,624,169 | B1 * | 1/2014 | Sorenson | A47J 37/0709 99/333 |
| 2001/0052207 | A1 * | 12/2001 | Davis | F24F 7/02 52/302.1 |
| 2017/0079473 | A1 * | 3/2017 | Bigott | A47J 39/003 |
| 2020/0367690 | A1 * | 11/2020 | Wang | A47J 36/165 |
| 2021/0362634 | A1 * | 11/2021 | Stepanov | B60N 2/5642 |

* cited by examiner

*Primary Examiner* — Nathaniel E Wiehe
*Assistant Examiner* — Keith Brian Assante (57) ABSTRACT

A hot food holding station is a device that can keep food warm, especially food that has been deep fried or cooked, thereby providing consumers convenience of serving heated ready-to-eat food. The device further ensures that edibles that are being held are evenly heated across the storage unit. In order to accomplish this, the device uses a heated airflow system that includes multiple air flow passages and a multi-functional grease tray ramp. The heated airflow system includes an air blower unit, an airflow unit, a heated air chamber and a food holding compartment that are fluidly communicated with one another. Further, the device utilizes fresh air from the atmosphere for heating the food, thereby preventing recirculation of air within the system.

16 Claims, 8 Drawing Sheets

HOT FOOD HOLDING STATION WITH MULTI-FUNCTIONAL RAMP

The current application claims a priority to the U.S. Provisional Patent application Ser. No. 62/949,684 filed on Dec. 18, 2019.

FIELD OF THE INVENTION

The present invention relates generally to food holding systems that helps with retaining heat and dispensing food products. More specifically, the present invention contains an airflow heated unit that will evenly distribute heat across all the food that is being held by a food holding compartment.

BACKGROUND OF THE INVENTION

There are many different apparatuses and mechanisms that carry ready-to-eat edibles in a storage area. While edibles are held in these storage areas, there are also mechanisms which keep the food warm by distributing heat within the storage area that will help with maintaining freshness. These edibles are then ready to be served to the consumers instantly as the edibles can be pulled out of the storage area and straight into the consumers hands. This method of holding ready-to-eat heated food are seen almost everywhere, especially in fast food restaurants. One example of this within fast food restaurants is after deep frying edibles, they are placed into a storage area where there is a heating mechanism that keeps the edibles heated and ready to serve to the consumers. However, there are times when the heating of these mechanisms is uneven, or the apparatus does not filter out excess grease off the deep-fried edibles. Thus, a heating device that can distribute heat evenly as well as maintain a cleaner surface is a rare find in the current market.

An objective of the present invention is to provide users with a device that can keep food warm and mess free, especially food that has been deep fried or cooked. In other words, the present invention intents to provide consumers convenience of serving heated ready-to-eat food. The present invention further ensures that edibles that are being held within the food storage unit are evenly heated. In order to accomplish this, the present invention uses a heated airflow system that comprises multiple air flow passages and a multi-functional grease tray ramp. Further, the present invention utilizes fresh air from the atmosphere for heating the food, thereby preventing recirculation of air within the system. Thus, the present invention is an efficient and improved design for a hot food holding station that can maintain the quality and freshness of hot food, without creating a greasy mess.

DETAIL DESCRIPTIONS OF THE INVENTION

All illustrations of the drawings are for the purpose of describing selected versions of the present invention and are not intended to limit the scope of the present invention.

In reference to FIG. 1 through FIG. 8, the present invention is a hot food holding station. An objective of the present invention is to provide users with a device that can keep food warm and mess free, especially food that has been deep fried or cooked. In other words, the present invention intents to provide consumers convenience of serving heated ready-to-eat food with improved quality. The present invention further ensures that edibles that are being held within the food storage unit are evenly heated. In order to accomplish this, the present invention uses a heated airflow system that comprises multiple air flow passages and a multi-functional grease tray ramp. Further, the present invention utilizes fresh air from the atmosphere for heating the food, thereby preventing recirculation of air within the system. Thus, the present invention is an efficient and improved design for a hot food holding station, that can maintain the quality and freshness of hot food, without creating a greasy surface.

Figure 5:
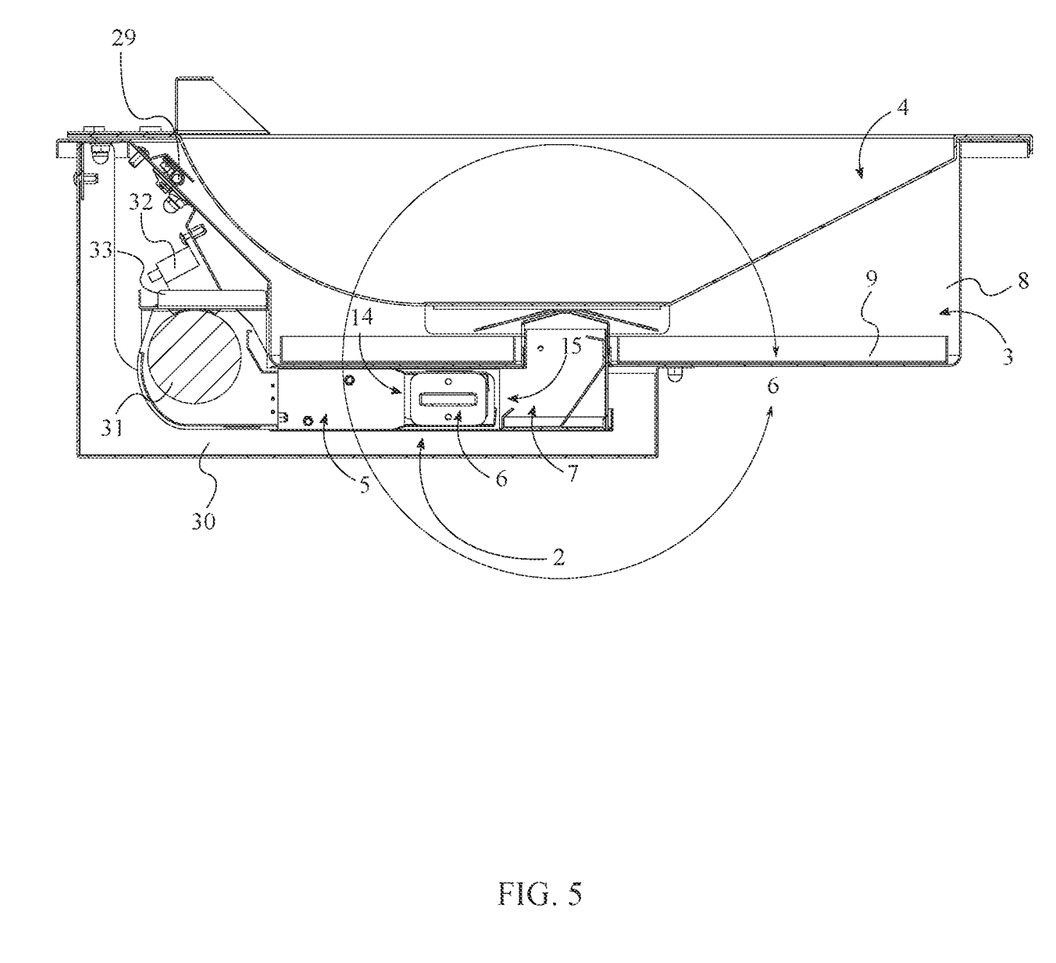
FIG. 5 is a sectional view of the present invention, taken along A-A' of FIG. 4.

The following description is in reference to FIG. 1 through FIG. 8. According to a preferred embodiment of the present invention, the hot food holding station comprises an air blower unit 1, an airflow unit 2, a heated air chamber 3 and a food holding compartment 4. The air blower unit 1, the airflow unit 2 and the heated air chamber 3 are used together to operate a heated airflow system of the present invention. As seen in FIG. 5, the airflow unit 3 comprises a first air flow chamber 5, a heater cartridge 6 and a second air flow chamber 7. Preferably, the heater cartridge 6 is connected between the first air flow chamber 5 and the second airflow chamber 7, such that fresh air from the first air flow chamber 5 gets hot as it traverses through the heater cartridge 6 and reaches the second air flow chamber 7. In reference to FIG. 5, the start of the heated airflow system can be seen as the air entering the air blower unit 1 on the left. The job of the first airflow chamber 5 is to hold incoming air that is delivered by the air blower unit 1. The first airflow chamber 5 is an air compression chamber as it compresses air into the heat cartridge 6. After the air has been pushed through the air blower unit 1 and the first airflow chamber 5, the air will now enter the heat cartridge 6.

It is an aim of the present invention to utilize air from the atmosphere, heat the air as it traverses through the device, and use that heated air to keep the food within the food holding compartment 4 hot. In order to accomplish that, the airflow unit 2 is connected between the air blower unit 1 and the heated air chamber 3. As the air blower unit 1 pushes the air through the outlet of the air blower unit 1, the air initially arrives in the first airflow chamber 4 of the airflow unit 2. Further, the heated air chamber 3 is connected between the airflow unit 2 and the food holding compartment 4, such that heated air reaches the food in the food holding compartment 4 through the heated air chamber 3. Preferably, the food holding compartment 4 comprises a rectangular frame with a curved bottom surface. However, the food holding compartment 4 may comprise any other shape, as long as the intents of the present invention are not altered.

Figure 1:
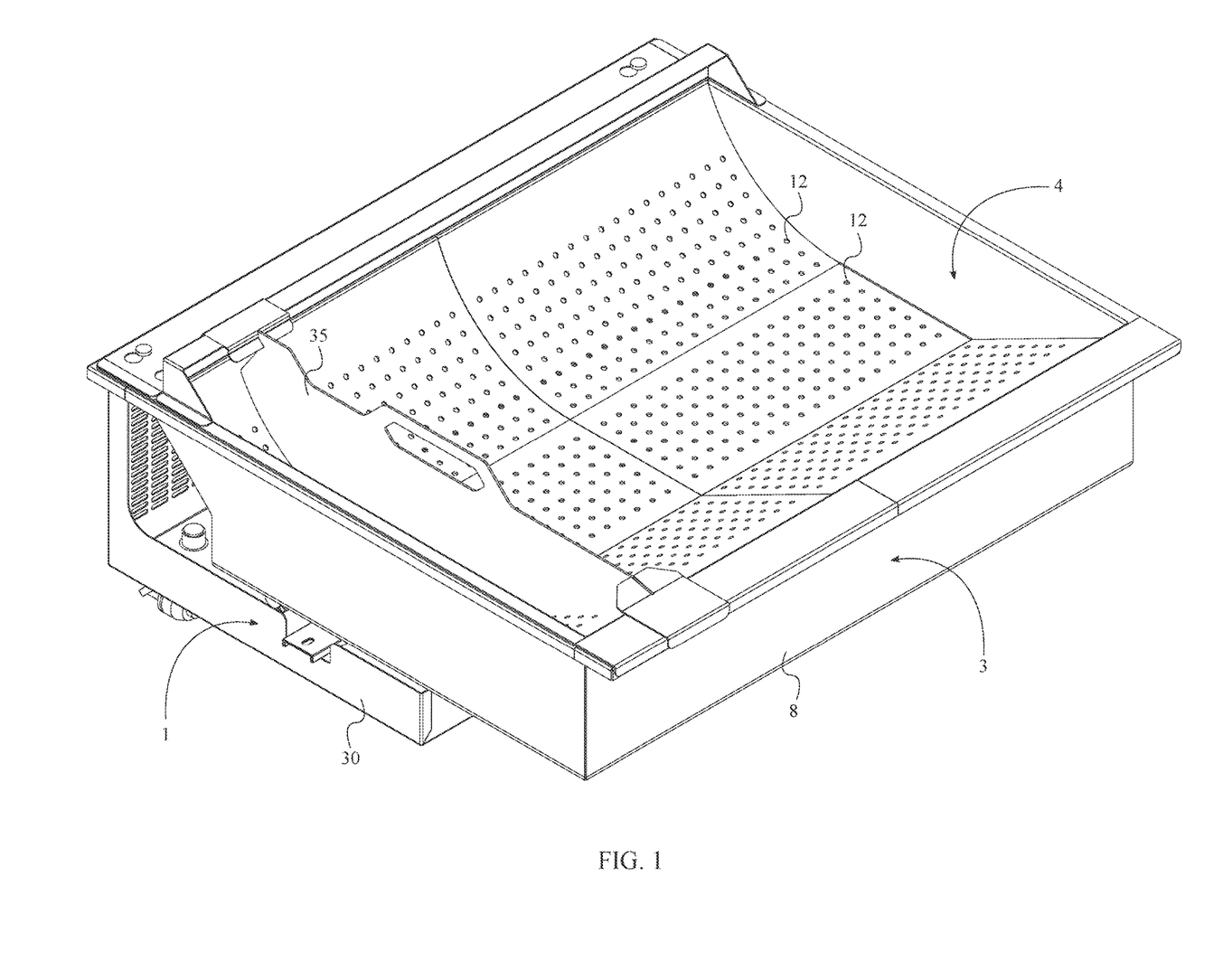
FIG. 1 is a top-front-right perspective view of the present invention.
Figure 2:
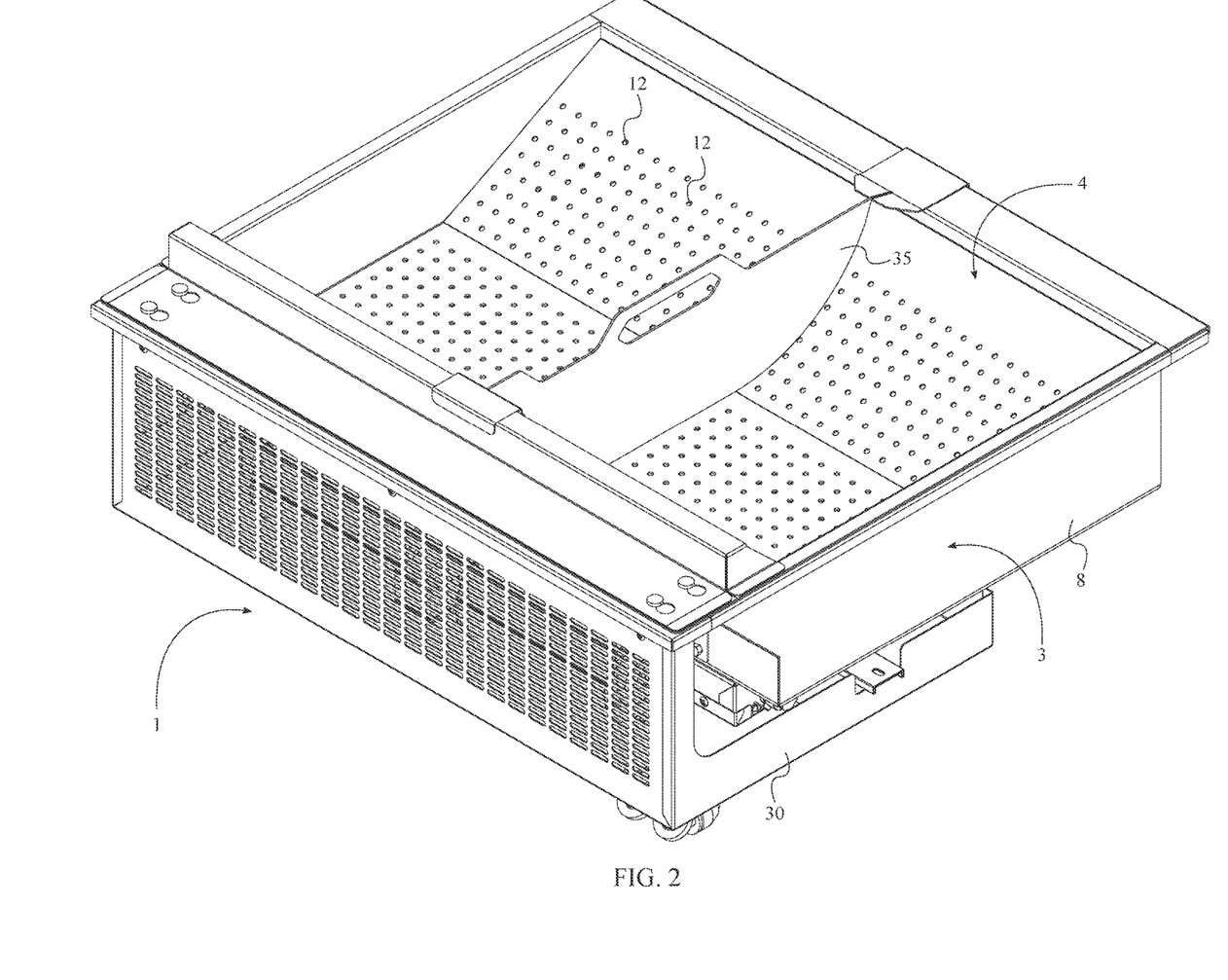
FIG. 2 is top-rear-right perspective view of the present invention, wherein a divider of the food holding station is positioned centrally.
Figure 3:
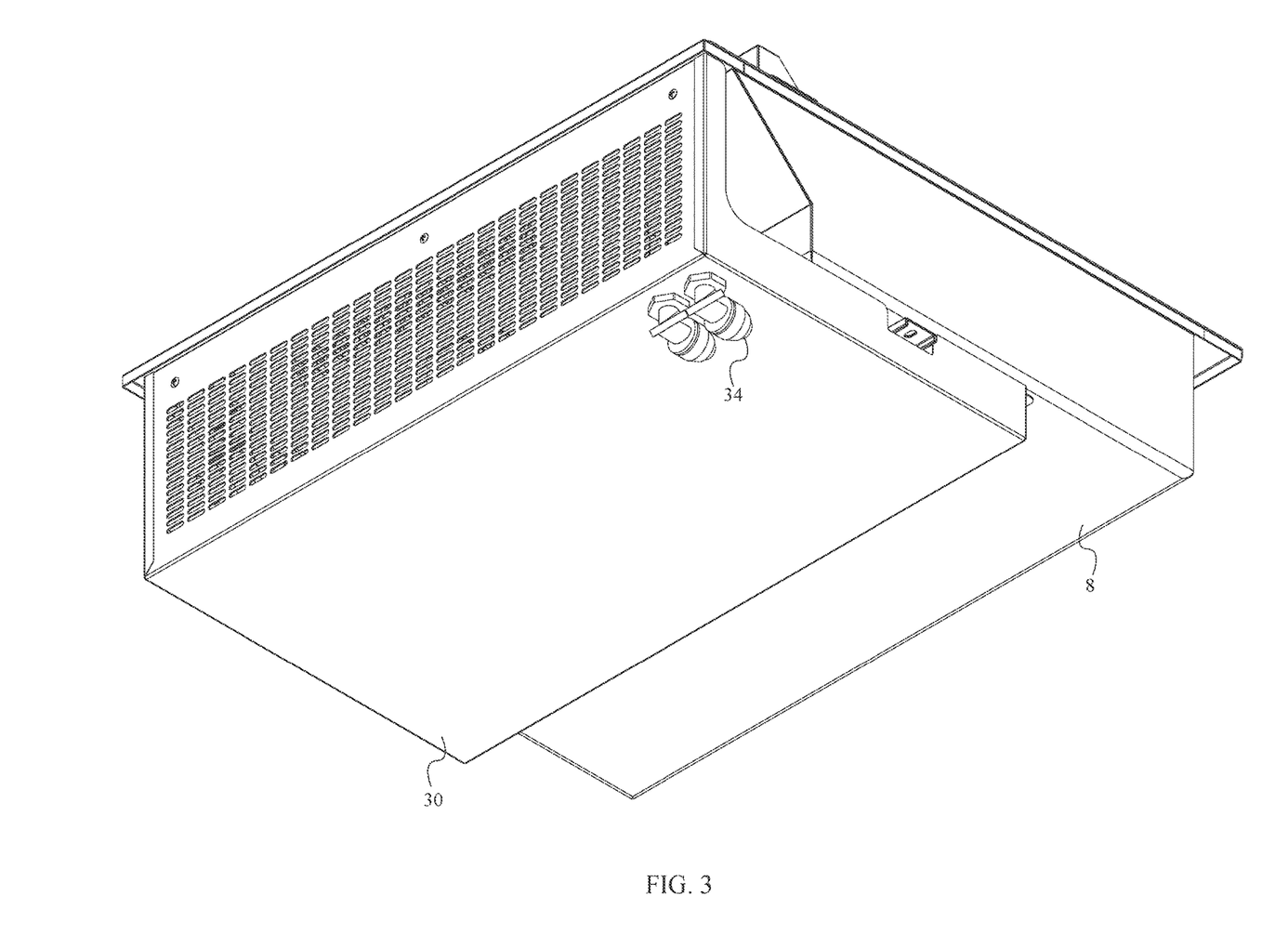
FIG. 3 is a bottom-rear-right perspective view of the present invention.
Figure 4:
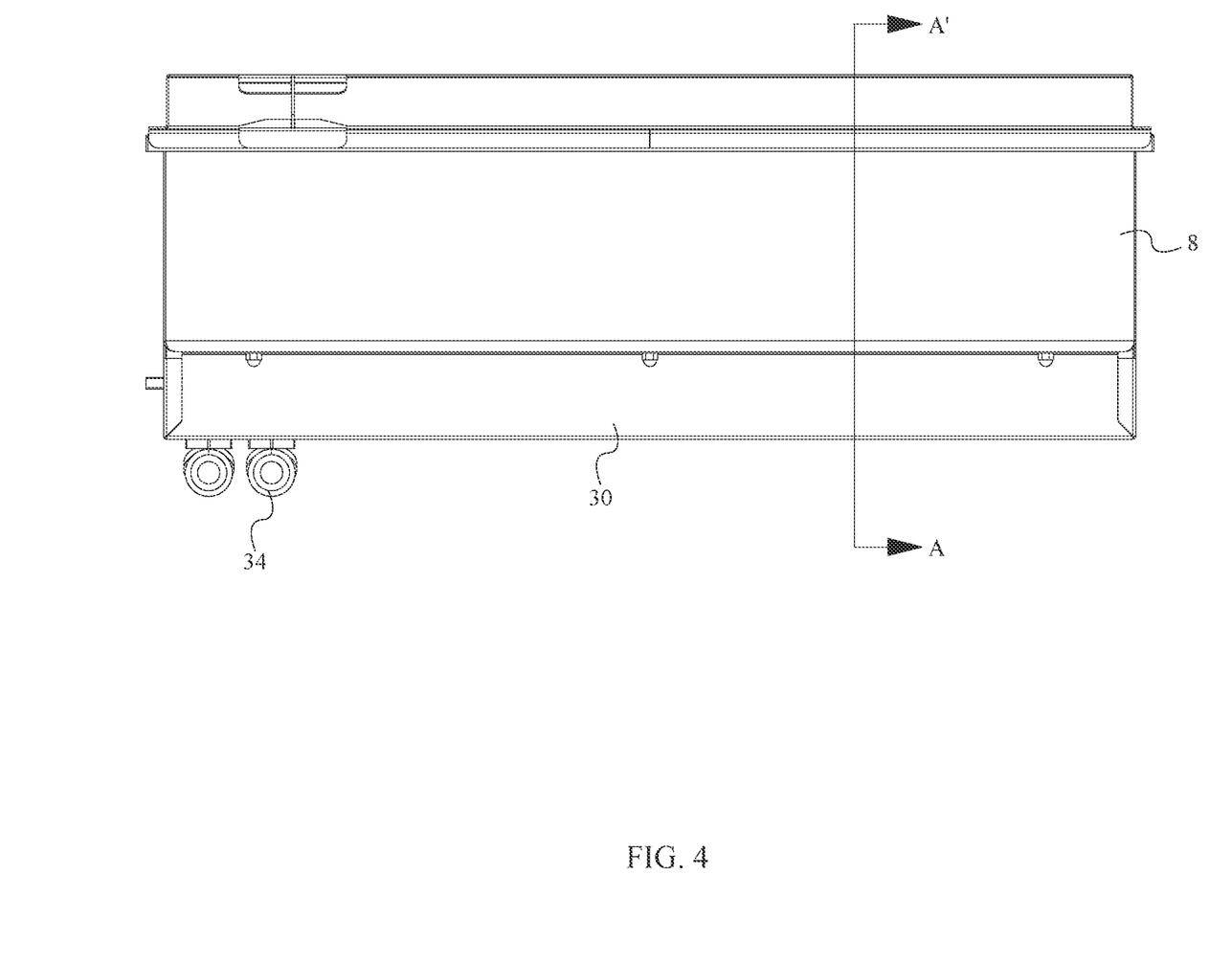
FIG. 4 is a front elevational view of the present invention.

According to the preferred embodiment, the heated air chamber 3 comprises a receptacle 8, a chamber tray 9, an airflow nozzle 10, and an airflow distribution cap 11. Preferably, the receptacle 8 has a rectangular shape with a depth ranging a few inches. However, the receptacle 8 may comprise any other shape, as long as the objectives of the present invention are fulfilled. The chamber tray 9, the airflow nozzle 10, and the airflow distribution cap 11 enable uniform distribution and withholding of the hot air necessary for the smooth functioning of the present invention. Further, the food holding compartment 4 comprises a plurality of apertures 12. As seen in FIG. 1 and FIG. 2, the plurality of apertures 12 is circular in shape. However, the plurality of apertures 12 may comprise any other size and shape, as long as the objectives of the present invention are fulfilled. As seen in FIG. 5, the chamber tray 9, the airflow nozzle 10, and the airflow distribution cap 11 are positioned within the receptacle 8. Further, the airflow distribution cap 11 is mounted onto a lower surface 4a of the food holding compartment 4, such that the air distribution cap 11 distributes air within the heated air chamber 3. Furthermore, the plurality of apertures 12 traverses through the food holding compartment 4 and the plurality of apertures 12 is distributed across the food holding compartment 4. This arrangement enables hot air in the heated air chamber 3 to get to the foot holding compartment 4 in a uniform manner, thereby enabling even heating of the food in the food holding compartment 4.

In order to accomplish the objectives of the present invention, there must be an efficient air transfer system functioning within the present invention. To that end, the food holding compartment 4 is in fluid communication with the heated air chamber 3 through the plurality of apertures 12, and the heated air chamber 3 is in fluid communication with the air flow unit 2 and the air blower unit 1. In other words, the air blower unit 1 intakes atmospheric air into the device and transfers it through the air flow unit 2. The air flow unit 2 compresses the air, makes it hot and sends it to the heated air chamber 3. In the preferred embodiment, the airflow nozzle 10 is operably coupled to the air distribution cap 11, such that the air distribution cap 11 distributes hot air coming through the airflow nozzle 10 within a space between the chamber tray 9 and the lower surface 4a of the food holding compartment 4. In other words, the components within the heated air chamber 3 distributes the hot air evenly within the heated air chamber 3 and passes the hot air into the food holding compartment 4 through the plurality of apertures 12.

Figure 6:
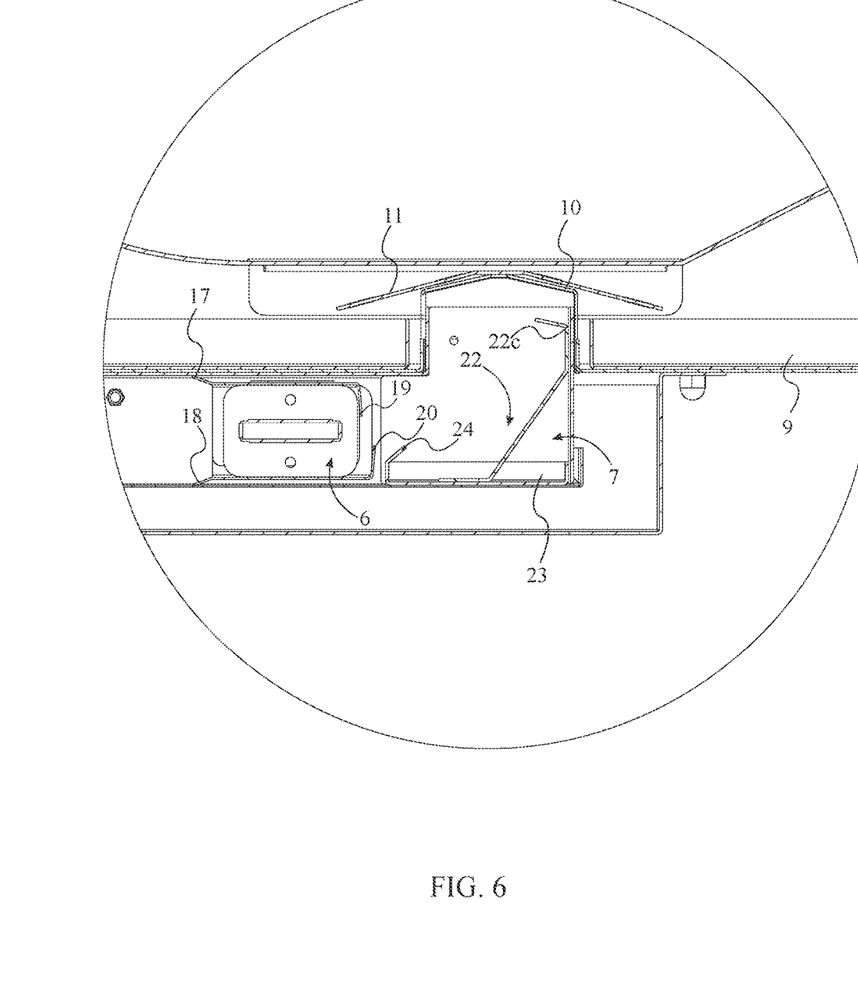
FIG. 6 is a detailed view of section 6 on FIG. 5.

Following description comprises a more specific and detailed description of the components of the preferred embodiment. As previously mentioned, the heat cartridge 6 is the component of the present invention that rises the temperature of the air flowing through the apparatus in order to maintain heat for the edibles being held by the present invention. To that end, the heater cartridge 6 comprises a casing 13, an inlet section 14, an outlet section 15, and a heater 16. In the preferred embodiment, the inlet section 14 is positioned opposite to the outlet section 15 across the casing 13, and the heater 16 is positioned within the casing 13. This is so that the inlet section 14 directs air coming from the first airflow chamber 5 into the heater 16 to create heated air and then directs the heated air to the outlet section 15. As seen in FIG. 6, the inlet section 14 acts as a barrier that guide the incoming air into the casing 13. In other words, the inlet section 14 acts as a funnel for incoming air that is led straight into the heater 16. Continuing with the preferred embodiment of the present invention, the inlet section 14 comprises a first flange 17 and a second flange 18, and the outlet section 15 comprises a first nozzle 19 and a second nozzle 20.

Preferably, the first flange 17 is laterally offset from the second flange 18 in such a way that the first flange 17 and second flange 18 are wing-like attachments to one end of the heat cartridge 6 as shown in FIG. 6. In other words, the first flange 17 is located at a top end of the casing 13 and the second flange 18 is located at a bottom end of the casing 13. Note that the first flange 17 and second flange 18 are the entrances for air coming into the heat cartridge 6. The first flange 17 and second flange 18 are shaped as ramps on the ceiling and the base of the first airflow chamber 4 as shown in FIG. 6. Preferably, the first flange 17 and second flange 18 are tightly secured against the ceiling and base of the first airflow chamber 4 so that all the incoming air by means of the air blower unit will enter the heater 16. Accordingly, the first flange 17 and the second flange 18 are angularly offset from the casing 13, such that the first flange 17 and the second flange 18 are facing away from the heater 16. As the incoming air enters the heat cartridge 6, the air is heated and distributed through the opposite end of the heat cartridge 6. To that end, the first nozzle 19 is laterally offset from the second nozzle 20. As seen in FIG. 5 and FIG. 6, the first nozzle 19 and second nozzle 20 are located opposite to the first flange 17 and second flange 18 across the casing 13. Preferably, the first nozzle 19 is located at the top end of the casing 13 and the second nozzle 20 is located at the bottom end of the casing 13. Further, the first nozzle 19 and the second nozzle 20 are angularly offset from the casing 13, such that the first nozzle 19 and the second nozzle 20 are facing towards the heater 16 inside the casing 13. In other words, the shape of the first nozzle 19 and second nozzle 20 is a variation of the first flange 17 and second flange 18 except that instead of the wings pointing outwards, the wings are concaving inwards. This is so that, the first nozzle 19 and second nozzle 20 are used to help direct the heated air coming from the heater 16 into the second airflow chamber 7, thereby compressing the airflow against the trailing edge of the heating element and to restrict the airflow through the heater cartridge 6.

Figure 7:
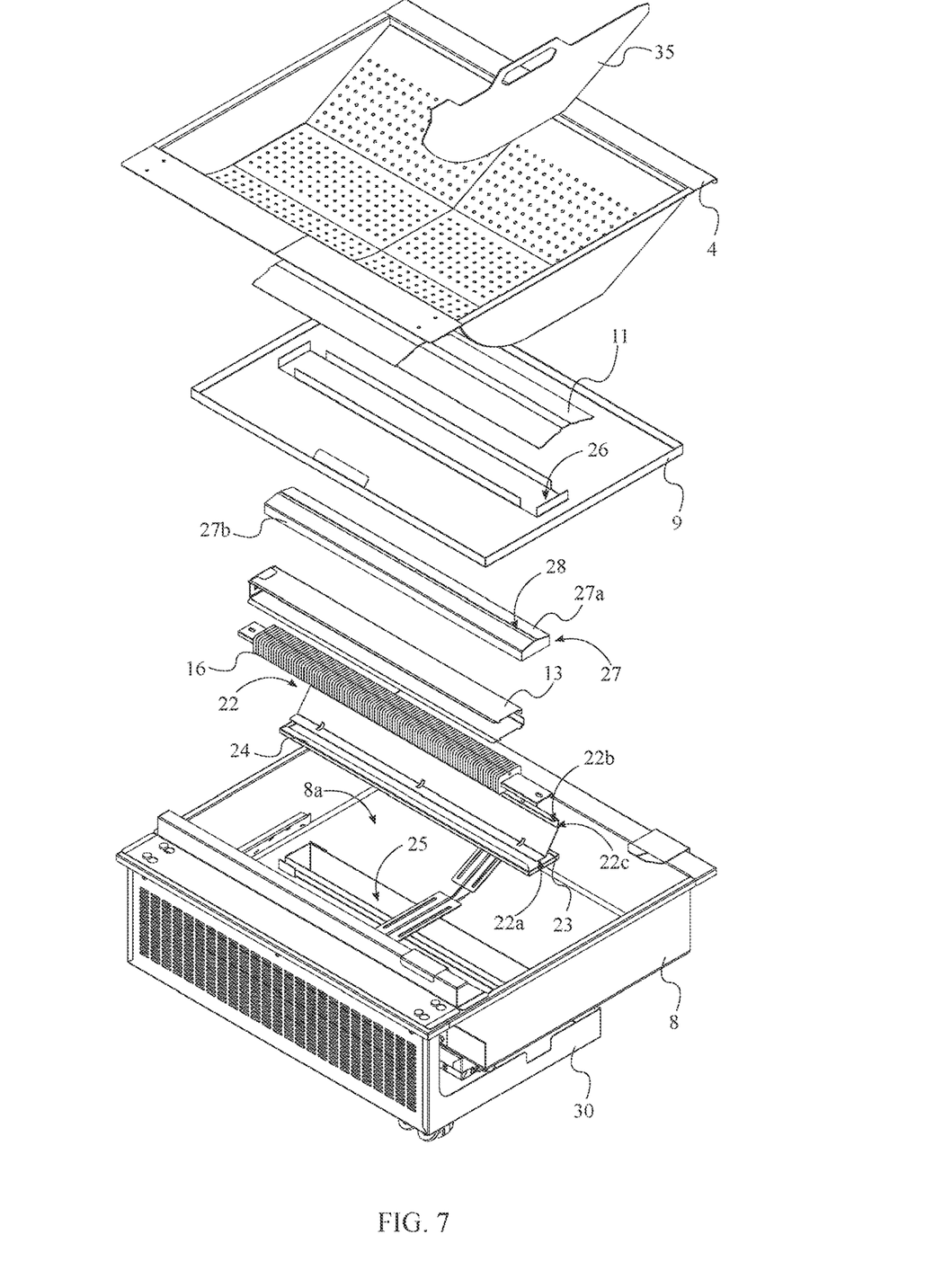
FIG. 7 is an exploded top-rear-left perspective view of the present invention.

Continuing with the preferred embodiment of the present invention, the second air flow chamber 7 comprises a grease tray 21, wherein the grease tray 21 is connected between the outlet section 15 and the airflow nozzle 10. This is so that, after passing through the first nozzle 19 and second nozzle 20, when the heated air reaches the second airflow chamber 7, the heated air first is forced up through the airflow nozzle 10 by means the grease tray 21. Preferably, the grease tray 21 serves two main purposes. The first purpose of holding excessive grease that is leaked off from the edibles being held warm at the food holding compartment 4, and the second purpose of helping to guide the heated air towards the exit point of the apparatus in order to keep the edibles heated and warm. In order to accomplish that, the grease tray 21 comprises a ramp 22, a base 23, and a plurality of barriers 24. Further, the ramp 22 comprises a first end 22a, a second end 22b, and a bent section 22c, wherein the first end 22a is positioned opposite to the second end 22b across the ramp 22. As seen in FIG. 6 and FIG. 7, the bent section 22c is positioned adjacent the second end 22b, the first end 22a is mounted centrally across a width of the base 23, and the second end 22b is mounted adjacent the airflow nozzle 10. In other words, the ramp 22 begins in the base-center of a rectangular tray. Further, the ramp 22 is angularly offset from the base 23, such that the ramp 22 guides air coming from the outlet section 15 onto the airflow nozzle 10. Preferably, the ramp 22 angles upwards at an acute angle close to sixty to fifty degrees and straighten out ninety degrees up after reaching the airflow nozzle 10. After straightening out as shown in FIG. 6, the ramp 22 reaches the airflow nozzle 10, and the bent section 22c is created that curl slightly inwards to help guide the air through the airflow nozzle 10. In other words, the bent section 22c further guides the heated air in the desired direction. As seen in FIG. 7 and FIG. 10, the plurality of barriers 24 is perimetrically connected around the base 23, and the plurality of barriers 24 is normally positioned across the base 23. More specifically, the base 23 is a rectangular-shaped tray that has barriers perpendicular to the base 23 along the perimeter. This is so that the base 23 and plurality of barriers 24 at the perimeter of this component act as a tray for excessive grease that has leaked from the edibles being held. Preferably, the shape of the airflow nozzle 10 is such that, the airflow nozzle 10 is secured tightly with the grease tray 21 to ensure proper airflow through the apparatus.

Figure 8:
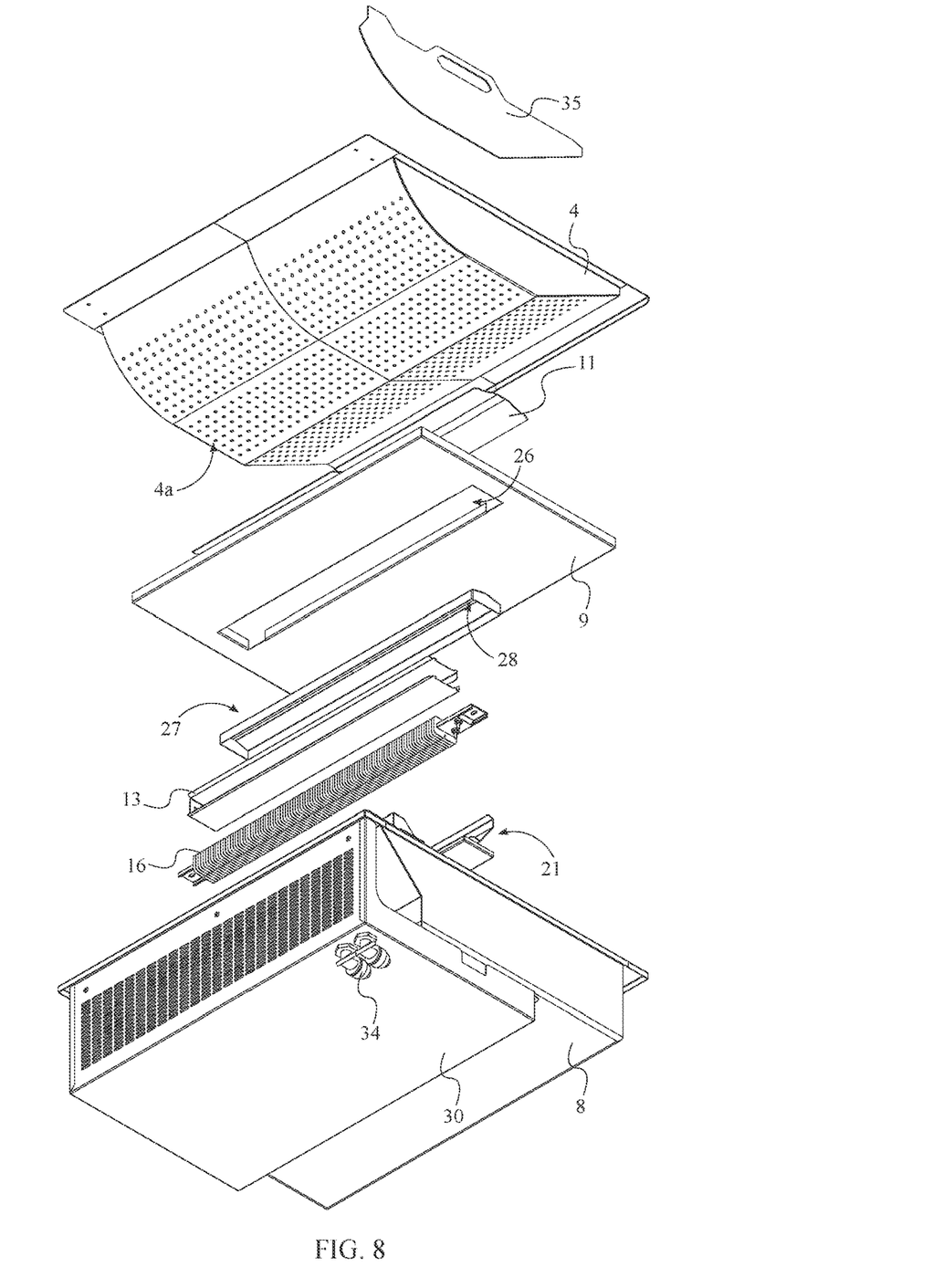
FIG. 8 is an exploded bottom-rear-right perspective view of the present invention.

In reference to FIG. 5, as the heated air passes the grease tray 21, it will need to go through the first component of the heated air chamber, which is the airflow nozzle 10. In order to position the airflow nozzle 10 efficiently and to enable transfer of hot air into the heated air chamber 3, the chamber tray 9 comprises a first aperture 25, and the receptacle 8 comprises a second aperture 26. As seen in FIG. 7 and FIG. 8, the first aperture 25 traverses through the chamber tray 9, and the first aperture 25 is positioned centrally across a length of the chamber tray 9. This positioning and dimension of the first aperture 25 enables a perfect fit and smooth transition of the airflow nozzle 10, and thus the heated air within the system. Further, the second aperture 26 traverses through a bottom surface 8a of the receptacle 8. As seen in FIG. 7, the first aperture 25 and the second aperture 26 are rectangular in shape. However, the first aperture 25 and the second aperture 26 may comprise any other shape and/or dimension, as long as the intents of the present invention are not altered. In the preferred embodiment, the receptacle 8 acts as the housing compartment for all the different components of the heated air chamber 3, and thus the second aperture 26 is key for the transmission and transfer of air between the second air flow chamber 7 and the heated air chamber 3. To that end, the chamber tray 9 is positioned between the airflow nozzle 10 and the air distribution cap 11, such the airflow nozzle 10 is secured tightly along the first aperture 25. Further, the chamber tray 9 delineates a bottom surface 3a of the heated air chamber 3, so that the chamber tray 9 bounds the heated air inside the apparatus underneath the food holding compartment 4.

According to the preferred embodiment, the airflow nozzle 10 regulates the heated air that is going to the airflow distribution cap 11. In order to accomplish that, the airflow nozzle 10 comprises a body 27 and an air slit 28. As seen in FIG. 7 and FIG. 8, the body 27 comprises a roof 27a and a plurality of walls 27b, wherein the plurality of walls 27b is positioned perimetrically around the roof 27a. In other words, the airflow nozzle 10 has a long rectangular houselike shape, with an empty base that allows the heated air to go through the airflow nozzle 10. Further, the air slit 28 traverses centrally along a length of the roof 27a. More specifically, the airflow nozzle 10 has two angled walls that look like a roof attached to the long sides of the walls, wherein a small opening (the air slit) at the top allows heated air to go through the airflow nozzle 10. Furthermore, the airflow nozzle 10 is pressed against the chamber tray 9, and the air slit 28 is operably coupled to the air distribution cap 11 through the first aperture 25. As previously mentioned, the airflow distribution cap 11 is attached under the food holding compartment 4. Additionally, the shape and size of the air distribution cap 11 is equivalent to the airflow nozzle 10 as the airflow distribution cap 11 and airflow nozzle 10 are secured tightly against each other. In other words, as the heated air passes through the airflow nozzle 10, the heated air is compressed against the airflow distribution cap 11 and distributed to the heated air chamber 3, which is the space beneath the food holding compartment 4. Thus, the air distribution cap ensures even distribution of heated air across the heated air chamber 3.

In the preferred embodiment, the heated air chamber 3 is the compartment of the apparatus which contains the heated air that is distributed to the edibles on the food holding compartment 4. In order to maintain temperature control within the device, the heated air chamber 3 further comprises a temperature probe 29. As seen in FIG. 5, the temperature probe 29 is positioned along a wall of the receptacle 8. However, the temperature probe 29 may be positioned on any other location across the device, as long as the objectives of the present invention are fulfilled. Further, the temperature probe 29 enables an accurate temperature control method as it reflects the temperature of the heated air chamber 3. In other words, the temperature probe 29 will give knowledge of whether the temperature is acceptable or not within the apparatus.

It is an aim of the present invention to establish a system that can utilize atmospheric air for heating the edibles in the food holding compartment and enable continuous generation of hot air with the present invention. This would prevent repeated usage or recirculation of the same heated air, thereby improving the quality of the food, as well as preventing overheating. Accordingly, the initial functioning of the heated airflow system begins when air enters the air blower unit 1. In order to accomplish the above-mentioned functioning, the air blower unit 1 comprises a base receptacle 30, a suction motor 31, a microcontroller 32, and a power source 33, wherein the suction motor 31, the microcontroller 32 and the power source 33 being mounted within the base receptacle 30. As seen in FIG. 5, the base receptacle 30 constitutes the primary casing that holds the important electric and electronic components of the present invention in a closed and safe location. Further, suction motor 31 is intended to draw air through openings on the base receptacle 30, and the microcontroller 32 is a processing device that manages the operation of the electrical components within the present invention. Furthermore, the power source 33 is also positioned within the base receptacle 30 isolated from hazards in the external environment. Preferably, the power source 33 is a rechargeable battery, that is used to deliver electrical power to the microcontroller 32 and the suction motor 31. However, any other source of power, or a combination power sources may be employed for the smooth functioning of the hot food holding station. Furthermore, the present invention may comprise at least one electrical connector 34, which may be mounted onto a surface of the base receptacle 30, for providing electrical connectivity between the power source 33 and an external power supply. Additionally, the temperature probe 29 and the power source 33 are electronically connected to the microcontroller 32, so as to enable the smooth functioning of the electric and electronic components of the present invention. In the preferred embodiment, the suction motor 31 induces a pressure differential that draws atmospheric air into the first air flow chamber 5. Accordingly, the suction motor 31 may comprise any brand, size, or power, as long as the suction motor 31 fits within the dimensions of the base receptacle 30 and fulfills the intends of the present invention.

As seen in FIG. 1, FIG. 2 and FIG. 7 through FIG. 8, the present invention comprises a divider 35. Preferably, the divider 35 is positioned within the food holding compartment 4, wherein the divider 35 is laterally displaceable across a length of the food holding compartment 4. This is so that, the divider 35 can section the food holding compartment 4 into multiple compartments, thereby enabling to store more than one kind of food and thus user friendliness. In other words, the divider 35 divides the food holding compartment 4 into a plurality of compartments. It should be noted that the present invention may comprise any other components that may be needed for the smooth functioning or improved functionalities of the hot food holding station. Thus, the present invention is an efficient and improved design for a hot food holding station, that can maintain the quality and freshness of hot food, without creating a greasy surface.

Although the invention has been explained in relation to its preferred embodiment, it is to be understood that many other possible modifications and variations can be made without departing from the spirit and scope of the invention as hereinafter claimed.

What is claimed is:

1. A hot food holding station, comprising:
   an air blower unit;
   an airflow unit;
   a heated air chamber; and
   a food holding compartment;
   the airflow unit comprising a first air flow chamber, a heater cartridge and a second air flow chamber;
   the heated air chamber comprising a receptacle, a chamber tray, an airflow nozzle, and an airflow distribution cap;
   the food holding compartment comprising a plurality of apertures;
   the airflow unit being connected between the air blower unit and the heated air chamber;
   the heater cartridge being connected between the first air flow chamber and the second airflow chamber;
   the heated air chamber being connected between the airflow unit and the food holding compartment;
   the chamber tray, the airflow nozzle, and the airflow distribution cap being positioned within the receptacle;
   the airflow distribution cap being mounted onto a lower surface of the food holding compartment;
   the plurality of apertures traversing through the food holding compartment;
   the plurality of apertures being distributed across the food holding compartment;
   the food holding compartment being in fluid communication with the heated air chamber through the plurality of apertures;
   the heated air chamber being in fluid communication with the air flow unit and the air blower unit;
   the airflow nozzle being operably coupled to the air distribution cap, such that the air distribution cap distributes hot air coming through the airflow nozzle within a space between the chamber tray and the lower surface of the food holding compartment;
   the heater cartridge comprising a casing, an inlet section, an outlet section, and a heater;
   the inlet section being positioned opposite to the outlet section across the casing;
   the heater being positioned within the casing;
   the second air flow chamber comprising a grease tray;
   the grease tray being connected between the outlet section and the airflow nozzle; and
   the grease tray comprising a ramp, a base, and a plurality of barriers.

2. The hot food holding station of claim 1, comprising:
   the inlet section comprising a first flange and a second flange;
   the outlet section comprising a first nozzle and a second nozzle;
   the first flange being positioned on top of the casing;
   the second flange being positioned on bottom of the casing;
   the first flange and the second flange facing outward, away from the heater;
   the first nozzle being positioned on top of the casing;
   the second nozzle being positioned on bottom of the casing; and
   the first nozzle and the second nozzle facing inward, towards the heater.

3. The hot food holding station of claim 1, comprising:
   the ramp comprising a first end, a second end, and a bent section, wherein the first end is positioned opposite to the second end across the ramp;
   the bent section being positioned adjacent the second end;
   the first end being mounted centrally across a width of the base;
   the second end being mounted adjacent the airflow nozzle;
   the ramp being angled upward at an acute angle with the base, such that the ramp guides air coming from the outlet section onto the airflow nozzle;
   the plurality of barriers being perimetrically connected around the base; and
   the plurality of barriers being normally positioned across the base.

4. The hot food holding station of claim 1, comprising:
   the chamber tray comprising a first aperture;
   the receptacle comprising a second aperture;
   the first aperture traversing through the chamber tray;
   the first aperture being positioned centrally across a length of the chamber tray;
   the second aperture traversing through a bottom surface of the receptacle;
   the chamber tray being positioned between the airflow nozzle and the air distribution cap.

5. The hot food holding station of claim 4, comprising:
   the airflow nozzle comprising a body and an air slit;
   the body being a roof and a plurality of walls;
   the plurality of walls being positioned perimetrically around the roof;
   the air slit traversing centrally along a length of the roof;
   the airflow nozzle being pressed against the chamber tray; and
   the air slit being operably coupled to the air distribution cap through the first aperture.

6. The hot food holding station of claim 4, wherein the first aperture and the second aperture being rectangular in shape.

7. The hot food holding station of claim 1, wherein the chamber tray delineates a bottom surface of the heated air chamber.

8. The hot food holding station of claim 1, comprising:
   a temperature probe; and
   the temperature probe being positioned along a wall of the receptacle.

9. The hot food holding station of claim 8, comprising:
   the air blower unit comprising a base receptacle, a suction motor, a microcontroller, and a power source;
   the suction motor, the microcontroller and the power source being mounted within the base receptacle;

the temperature probe being electronically connected to the microcontroller; and the power source being electronically connected to the microcontroller.

10. The hot food holding station of claim 9, wherein the suction motor induces a pressure differential that draws atmospheric air into the first air flow chamber.

11. The hot food holding station of claim 1, comprising:
a divider;
the divider being positioned within the food holding compartment;
the divider being displaceable across a length of the food holding compartment;
the divider dividing the food holding compartment into a plurality of compartments.

12. A hot food holding station, comprising:
an air blower unit;
an airflow unit;
a heated air chamber; and
a food holding compartment;
the airflow unit comprising a first air flow chamber, a heater cartridge and a second air flow chamber;
the heated air chamber comprising a receptacle, a chamber tray, an airflow nozzle, and an airflow distribution cap;
the food holding compartment comprising a plurality of apertures;
the airflow unit being connected between the air blower unit and the heated air chamber;
the heater cartridge being connected between the first air flow chamber and the second airflow chamber;
the heated air chamber being connected between the airflow unit and the food holding compartment;
the chamber tray, the airflow nozzle, and the airflow distribution cap being positioned within the receptacle;
the chamber tray delineating a bottom surface of the heated air chamber;
the airflow distribution cap being mounted onto a lower surface of the food holding compartment;
the plurality of apertures traversing through the food holding compartment;
the plurality of apertures being distributed across the food holding compartment;
the food holding compartment being in fluid communication with the heated air chamber through the plurality of apertures;
the heated air chamber being in fluid communication with the air flow unit and the air blower unit;
the airflow nozzle being operably coupled to the air distribution cap, such that the air distribution cap distributes hot air coming through the airflow nozzle within a space between the chamber tray and the lower surface of the food holding compartment;
the heater cartridge comprising a casing, an inlet section, an outlet section, and a heater;
the inlet section being positioned opposite to the outlet section across the casing;
the heater being positioned within the casing;
the inlet section comprising a first flange and a second flange;
the outlet section comprising a first nozzle and a second nozzle;
the first flange being positioned on top of the casing;
the second flange being positioned on bottom of the casing;
the first flange and the second flange facing outward, away from the heater;
the first nozzle being positioned on top of the casing;
the second nozzle being positioned on bottom of the casing;
the first nozzle and the second nozzle facing inward, towards the heater;
the second air flow chamber comprising a grease tray; and
the grease tray being connected between the outlet section and the airflow nozzle.

13. The hot food holding station of claim 12, comprising:
the grease tray comprising a ramp, a base, and a plurality of barriers;
the ramp comprising a first end, a second end, and a bent section, wherein the first end is positioned opposite to the second end across the ramp;
the bent section being positioned adjacent the second end;
the first end being mounted centrally across a width of the base;
the second end being mounted adjacent the airflow nozzle;
the ramp being angled upward at an acute angle with the base, such that the ramp guides air coming from the outlet section onto the airflow nozzle;
the plurality of barriers being perimetrically connected around the base; and
the plurality of barriers being normally positioned across the base.

14. The hot food holding station of claim 12, comprising:
the chamber tray comprising a first aperture;
the receptacle comprising a second aperture;
a temperature probe;
the first aperture traversing through the chamber tray;
the first aperture being positioned centrally across a length of the chamber tray;
the second aperture traversing through a bottom surface of the receptacle;
the chamber tray being positioned between the airflow nozzle and the air distribution cap; and
the temperature probe being positioned along a wall of the receptacle.

15. The hot food holding station of claim 14, comprising:
the airflow nozzle comprising a body and an air slit;
the body being a roof and a plurality of walls;
the plurality of walls being positioned perimetrically around the roof;
the air slit traversing centrally along a length of the roof;
the airflow nozzle being pressed against the chamber tray; and
the air slit being operably coupled to the air distribution cap through the first aperture.

16. The hot food holding station of claim 12, comprising:
the air blower unit comprising a base receptacle, a suction motor, a microcontroller, and a power source;
the suction motor, the microcontroller and the power source being mounted within the base receptacle;
the temperature probe being electronically connected to the microcontroller; and
the power source being electronically connected to the microcontroller.

* * * * *